United States Patent
Vergnaud et al.

(10) Patent No.: US 6,992,599 B2
(45) Date of Patent: Jan. 31, 2006

(54) TERMINAL ADAPTER FOR CONNECTING A TERMINAL TO A COMPUTER LOCAL AREA NETWORK CAPABLE OF IDENTIFYING ANY OF SEVERAL TERMINAL TYPES

(75) Inventors: Gérard Vergnaud, Franconville (FR); Giovanni Dortu, Cormeilles en Parisis (FR)

(73) Assignee: Alcatel, Paris (FR)

( * ) Notice: Subject to any disclaimer, the term of this patent is extended or adjusted under 35 U.S.C. 154(b) by 243 days.

(21) Appl. No.: 09/995,721

(22) Filed: Nov. 29, 2001

(65) Prior Publication Data

US 2002/0089997 A1   Jul. 11, 2002

(30) Foreign Application Priority Data

Jan. 8, 2001  (FR) .................................. 01 00169

(51) Int. Cl.
  *G06F 1/26*   (2006.01)
(52) U.S. Cl. ................. 340/999; 379/413.02; 709/220; 713/310
(58) Field of Classification Search ................ 340/999; 713/310; 710/15, 68; 709/220, 228; 370/254; 379/413.02
  See application file for complete search history.

(56) References Cited

U.S. PATENT DOCUMENTS

| | | | |
|---|---|---|---|
| 5,991,885 A * | 11/1999 | Chang et al. ................ | 713/300 |
| 5,994,998 A | 11/1999 | Fisher et al. ........... | 340/310.01 |
| 6,115,468 A | 9/2000 | De Nicolo ................... | 379/413 |
| 6,218,930 B1 * | 4/2001 | Katzenberg et al. ... | 340/310.01 |
| 6,246,671 B1 * | 6/2001 | Lattanzi et al. ............. | 370/254 |
| 6,535,983 B1 * | 3/2003 | McCormack et al. ....... | 713/310 |
| 6,614,803 B1 * | 9/2003 | Farnsworth et al. ........ | 370/465 |

FOREIGN PATENT DOCUMENTS

| | | |
|---|---|---|
| EP | 0 981 227 A2 | 2/2000 |
| WO | WO 00/41496 | 7/2000 |

\* cited by examiner

*Primary Examiner*—Brent A. Swarthout
(74) *Attorney, Agent, or Firm*—Sughrue Mion, PLLC

(57) ABSTRACT

A terminal adapter connects a terminal to a computer local area network capable of identifying any of several terminal types by detecting the presence of a particular identifier electronic circuit specific to one type, even though the terminal does not include any such identifier circuit as standard. The terminal adapter includes first connectors for inserting the adapter between two sections of a connection between the terminal and the network and an identifier circuit specific to one type of terminal that the network is able to detect. The identifier circuit is connected to at least two conductors of a network side section of the connection.

5 Claims, 2 Drawing Sheets

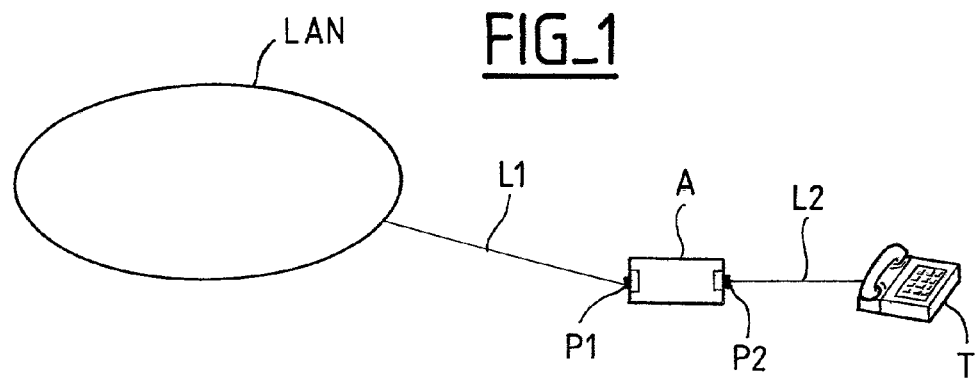
FIG_1
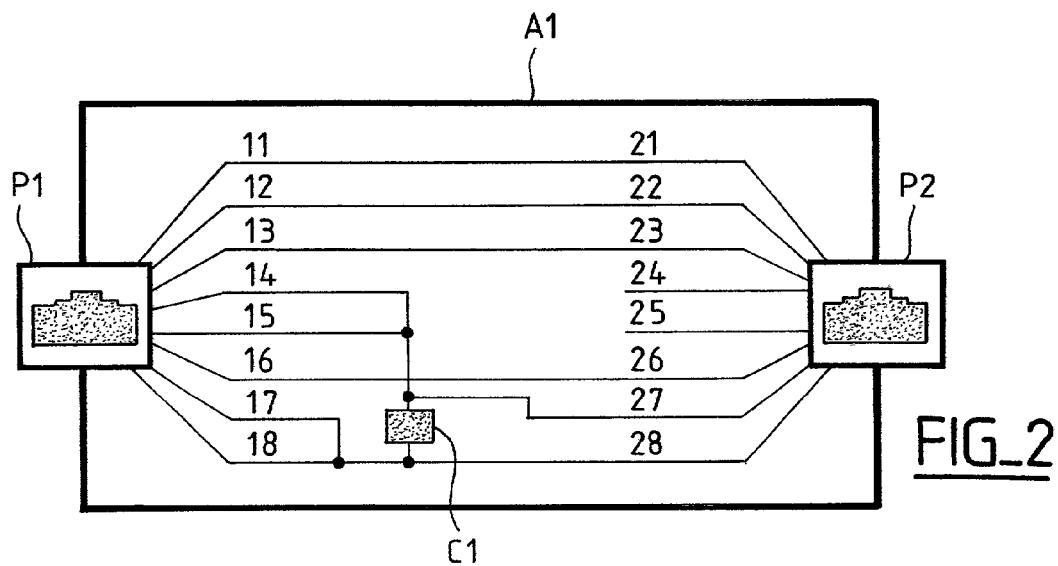
FIG_2
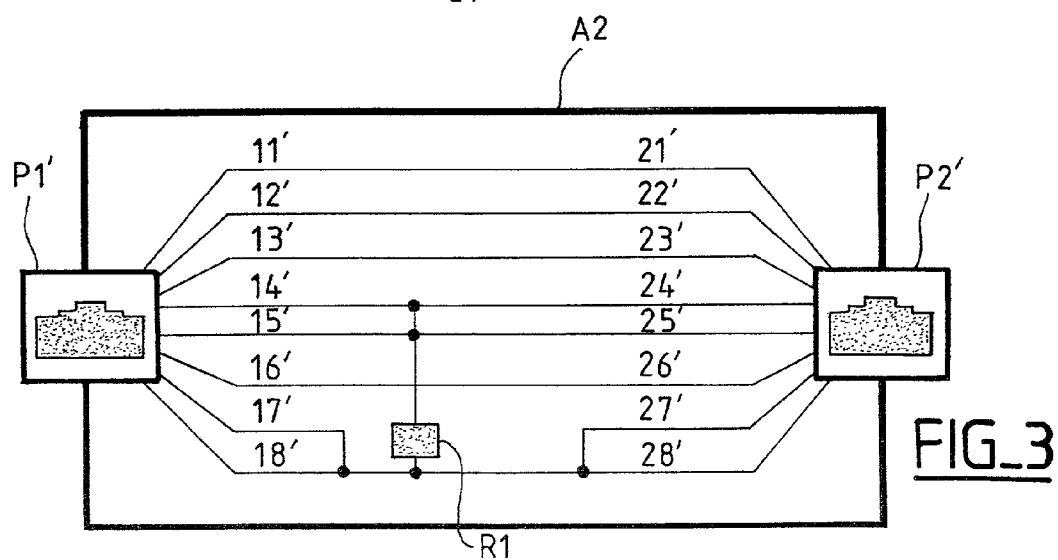
FIG_3

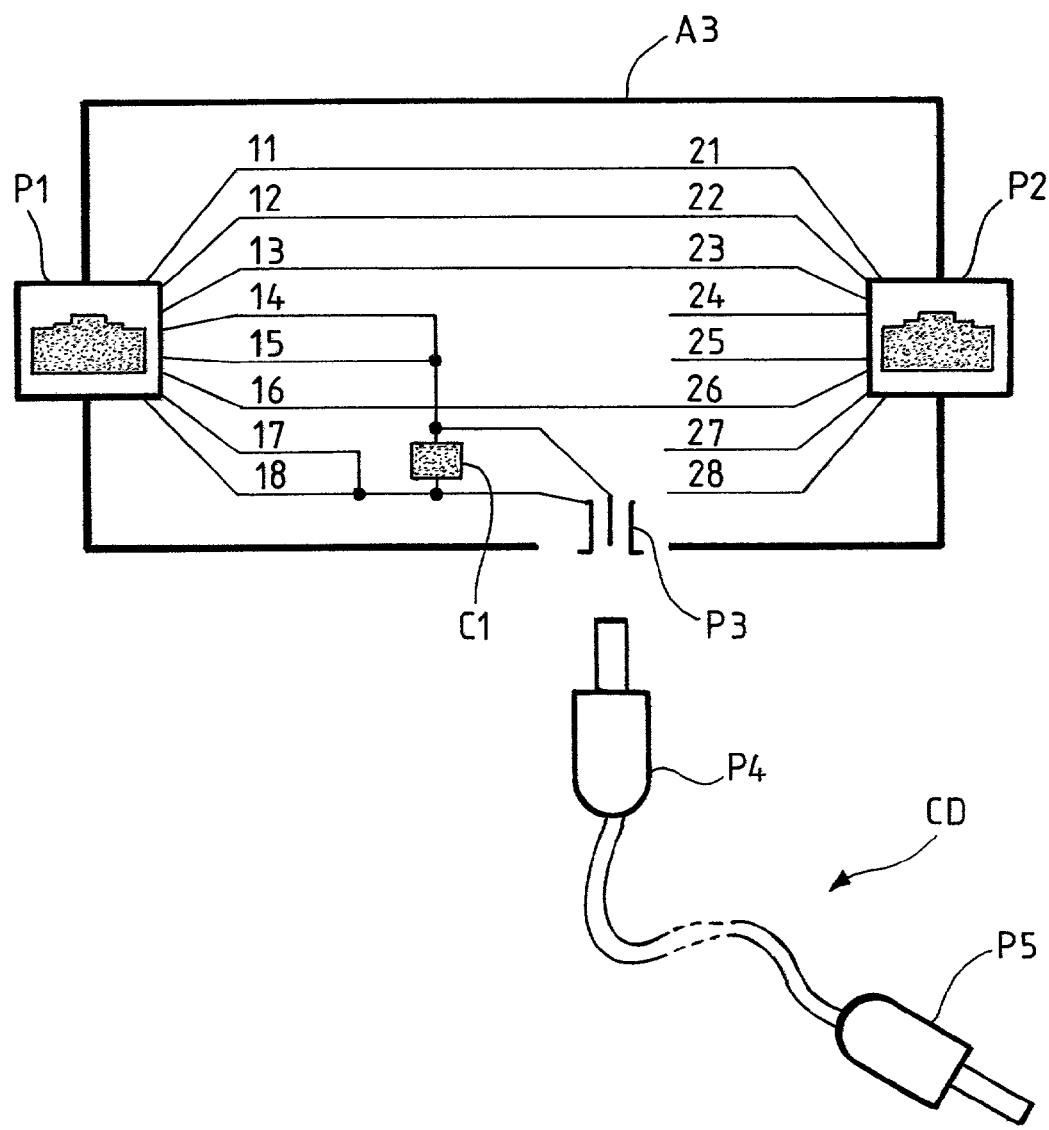
FIG_4

TERMINAL ADAPTER FOR CONNECTING A TERMINAL TO A COMPUTER LOCAL AREA NETWORK CAPABLE OF IDENTIFYING ANY OF SEVERAL TERMINAL TYPES

CROSS-REFERENCE TO RELATED APPLICATIONS

This application is based on French Patent Application No. 0100169 filed Jan. 8, 2001, the disclosure of which is hereby incorporated by reference thereto in its entirety, and the priority of which is hereby claimed under 35 U.S.C. §119.

BACKGROUND OF THE INVENTION

1. Field of the Invention

The present invention relates to a terminal adapter for connecting a terminal to a computer local area network capable of identifying any of several terminal types. It relates in particular to terminals adapted to be supplied with power locally and to receive a remote power feed via a connection to a computer local area network, for example an Ethernet network.

2. Description of the Prior Art

Conventionally, terminals connected to a computer local area network (for example personal computers, printers, etc.) are supplied with power locally, by the mains power supply. 110 V or 220 V power supply cords independent of the data connections are therefore used to supply power to the terminals. This solution makes it more difficult to install the local area network:

The use of two cables gives rise to problems of congestion, which can also limit the freedom of movement of persons.

It creates electrical hazards.

In the case of a telephone, a local power supply from the mains power supply has the further disadvantage that the telephone is unserviceable in the event of a mains power outage, in particular in the event of a fire or natural disaster. This is why conventional telephones receive a remote power feed from their local exchange, which includes back-up batteries.

Telephone terminals connected to a computer local area network are coming into use. It is therefore desirable that some terminals connected to a computer local area network receive a remote power feed via the connection used to send/receive data. One way to transmit a remote power feed current is to use two of the eight wires of the connection: four other wires from those eight wires constitute two pairs of wires respectively used to transmit and receive data. Another method, known as the phantom circuit method, connects the two terminals of a power supply generator in the remote power feed device to the respective center-taps of a winding of a transformer connected to the data receiver pair and a winding of another transformer connected to the data sender pair. At the terminal end, the supply voltage is provided by the respective center-taps of a winding of a transformer connected to the data receiver pair and a winding of another transformer connected to the data sender pair.

In both cases, providing a remote power feed to a terminal via the computer local area network has the disadvantage that the remote power feed device powers a terminal "blind". The RJ45 connector at the end of the connection can be plugged into a terminal of a type other than a telephone (for example a personal computer, a printer, etc.). There is a risk of damaging the electrical circuits of that terminal. The RJ45 connector of a terminal is generally used in the following manner:

Four of the eight wires are divided into two pairs for respectively transmitting and receiving data. The terminal includes a transformer having a winding connected to the receiver pair and a transformer having a winding connected to the sender pair, each of these windings having a center-tap that can be connected to a reference potential via a low-value resistor.

Four other, unused wires are grounded, often via a combination of resistors and capacitors, to eliminate any crosstalk currents induced by the data signals circulating in the first four wires and to reduce undesirable electromagnetic emissions. If a relatively high supply voltage, for example 48 volts, is applied to this combination of resistors and capacitors, or to the resistors connected to the center-taps of the transformers, the current flowing in the resistors can destroy them.

Methods of providing a remote power feed to a terminal in a computer local area network avoiding all risk of damage if a terminal that is not adapted to receive a remote power feed from the network is connected thereto are currently under investigation.

One Such Method Entails:

producing a test signal, or a plurality of test signals, on at least two conductors of a connection intended to connect the local area network to a remote terminal, the signal(s) having an energy such that the terminal cannot be damaged under any circumstances;

detecting the presence of a remote terminal adapted to receive a remote power feed by detecting the presence of an identifier circuit placed in the remote terminal, shunting the connection, on the basis of the current created by the test signal(s) in the connection; and sending a remote power feed over the connection if and only if the presence of a terminal adapted to receive a remote power feed is detected.

A method of this kind avoids all risk to the terminals because the remote power feed current is sent only after identifying the terminal as one adapted to receive a remote power feed. The intensity and duration of the test signal(s) are chosen so that the operation of detecting the presence of a terminal adapted to receive a remote power feed, before sending the remote power feed, cannot cause any damage if the terminal is not a terminal adapted to receive a remote power feed.

Also, the remote power feed must be interrupted as soon as the terminal is disconnected from the connection, as another terminal could be connected to it at any time. There is therefore provision for continuously detecting the presence of a terminal during remote power feeding, by measuring the remote power feed current. The remote power feed device concludes that a disconnection has occurred if it detects that the current drawn is less than a predetermined threshold value during a time interval of predetermined duration which is sufficient to be sure that a disconnection has in fact taken place.

There is as yet no standard defining the interface between terminals adapted to receive a remote power feed and an Ethernet local area network, but terminals of this kind are already commercially available and included in installed networks. Each manufacturer uses its own interface; in particular, each manufacturer uses a different impedance to identify a given type of terminal and uses different conductors from the eight conductors of a connection, for example an Ethernet connection, to convey the remote power feed. It is not practicable to modify existing terminals to adapt them to the interface used by another manufacturer, and it is therefore not possible at present to mix in the same local area network terminals from different manufacturers adapted to receive a remote power feed.

The object of the invention is to enable mixing in the same local area network of terminals from different manufacturers adapted to receive a remote power feed.

SUMMARY OF THE INVENTION

The invention provides a terminal adapter for connecting a terminal to a computer local area network capable of identifying any of several terminal types by detecting the presence of a particular identifier electronic circuit specific to one type, even though the terminal does not include any such identifier circuit as standard, which terminal adapter includes:

first connectors for inserting the adapter between two sections of a connection between the terminal and the network, and an identifier circuit specific to one type of terminal that the network is able to detect, the identifier circuit being connected to at least two conductors of a network side section of the connection.

The combination of the terminal and the adapter is identified by the network as a terminal of the type corresponding to that identifier circuit, for example as a terminal of the type adapted to receive a remote power feed, because the network detects an identifier circuit in the adapter that is specific to that type of terminal, regardless of the interface actually used in the terminal. It goes without saying that, in this example, the terminal must be adapted to receive a remote power feed.

In one particular embodiment the identifier circuit is connected to at least two conductors of the network side section of the connection that convey the remote power feed.

In one particular embodiment the adapter further includes conductors connecting some conductors of the network side section of the connection to some conductors of the terminal side section of the connection to apply a remote power feed voltage to the appropriate conductors of the terminal side section of the connection.

In one particular embodiment the adapter further includes a second connector connected to some conductors of the network side section of the connection and wherein the conductors are adapted to provide a remote power feed voltage and the second connector is adapted to be connected to a power supply input of a terminal but not adapted to be connected to a data input of a terminal.

The above adapter has the advantage that there is no risk if the data input of a terminal that is not adapted to receive a remote power feed is connected to the adapter, because the first connector does not transmit the remote power feed and the second connector cannot be connected to a data input of a terminal.

The invention will be better understood and other features of the invention will become apparent in the light of the following description and the accompanying drawings.

BRIEF DESCRIPTION OF THE DRAWINGS

FIG. 1 shows a local area network connected to a terminal provided with one embodiment of an adapter according to the invention.

FIG. 2 shows a first embodiment of an adapter according to the invention.

FIG. 3 shows a second embodiment of an adapter according to the invention.

FIG. 4 shows a third embodiment of an adapter according to the invention.

DETAILED DESCRIPTION OF THE PREFERRED EMBODIMENTS

In FIG. 1, a computer local area network LAN is an Ethernet network operating at 100 megabits per second and capable of identifying two types of terminal, namely terminals that are adapted to receive a remote power feed and terminals that are not adapted to receive a remote power feed, the latter being able to receive power only locally from a mains power supply. The connection between the network LAN and the terminal T includes a section of cable L1 from the network LAN to an adapter A and a section of cable L2 from the adapter A to the terminal T. The two sections of cable each include eight conductors. They both terminate at the adapter A end in an 8-way male RJ45 connector.

FIG. 2 shows a first embodiment of an adapter according to the invention. The adapter A1 includes a female RJ45 connector P1 at the network end and a female RJ45 connector P2 at the terminal end. Inside the adapter A1, eight conductors 11, . . . , 18 connected to the connector P1 are interconnected with eight conductors 21, 22, . . . , 28 connected to the connector P2. They are interconnected in the following manner:

11–21: transmission of data.
12–22: transmission of data.
13–23: transmission of data.
14–15–27: one pole of the remote power feed.
16–26: transmission of data.
17–18–28: the other pole of the remote power feed.

The adapter A1 further includes an identifier circuit C1 which has one terminal connected to the conductors 14–15–27 and another terminal connected to the conductors 17–18–28. The identifier circuit C1 is, for example, a capacitor identifying the terminal type "adapted to receive a remote power feed", according to the specifications of the interface drawn up by a first manufacturer.

If the adapter were perfectly transparent, the connections would have been:

11–21
12–22
13–23
14–24
15–25
16–26
17–27
18–28

In this first embodiment, the conductors 14–15, on the one hand, and 17–18, on the other hand, constitute the network end remote power feed circuit. The adapter A1 enables the network LAN to detect the identifier circuit C1 connected between the two poles of the remote power feed during the test to identify a terminal connected to the connection, whereas the terminal T has no identifier circuit, or a different identifier circuit, for example corresponding to the specifications of another manufacturer.

At the terminal T end, the remote power feed is applied to the conductors 27 and 28 instead of the conductors 24–25 and 27–28, respectively. The adapter A1 therefore adapts the remote power feed and transmits the power to the appropriate conductors for that power to be used in the terminal T. Also, the electrical power is applied with the appropriate polarity.

FIG. 3 shows a second embodiment of an adapter according to the invention. It has a female RJ45 connector P1' at the network end and a female RJ45 connector P2' at the terminal end. Inside the adapter A2, eight conductors 11', . . . , 18' connected to the connector P1' are interconnected with eight conductors 21', . . . , 28' connected to the connector P2'. They are interconnected in the following manner:

11'–21': transmission of data.
12'–22': transmission of data.
13'–23': transmission of data.
14'–24'–15'–25': one pole of the remote power feed.
16'–26': transmission of data.
17'–18'–27'–28': the other pole of the remote power feed.

The adapter A2 further includes an identifier circuit R1 which has one terminal connected to the conductors 14'–24'–15'–25'and another terminal connected to the conductors 17'–18'–27'–28'. The identifier circuit R1 is a resistor identifying the terminal type "adapted to receive a remote power feed" for the local area network concerned. In this second embodiment both poles of the remote power feed are transmitted transparently.

FIG. 4 shows a third embodiment of the adapter according to the invention, which is a variant of the first embodiment. It is intended for terminals adapted to be powered by an external mains power unit supplying a DC voltage of 48 V, for example, or which can be powered in two modes, namely by an external unit and via the Ethernet connection. This type of unit includes a cord terminating in a male connector that plugs into a female connector on the terminal.

The adapter A3 differs from the adapter A1 in that the remote power feed is not transmitted via the RJ45 connector P2 but via a female connector P3 independent of the connector P2. The connector P3 is not an RJ45 connector but a two-contact, for example coaxial, connector connected to the conductors 14–15, on the one hand, and 17–18, on the other hand, to receive the remote power feed provided by the Ethernet link to the connector P1. The conductors 27 and 28 connected to the connector P2 are unused.

To power a terminal, a cord CD must be used in addition to an Ethernet cable connected to the cable P2. The cord CD has a male connector P4 that can be plugged into the connector P3 of the adapter A3 and at its other end a male connector P5 that can be plugged into a power supply input connector of the terminal.

This adapter has the advantage over the adapter A1 that there is no risk if a terminal that is not adapted to receive a remote power feed is connected to the connector P2, since the latter does not transmit the remote power feed.

The scope of the invention is not restricted to the two types of terminal mentioned above, or to 100 or 10 Mb/s Ethernet networks. An adapter according to the invention can be produced for any terminal connected by a cable connection to a computer local area network capable of identifying any of a plurality of types by detecting the presence of an electronic circuit in the terminal.

What is claimed is:

1. A terminal adapter for connecting a terminal to a computer local area network capable of identifying any of several terminal types by detecting the presence of a particular identifier electronic circuit specific to one type, even though said terminal does not include any such identifier circuit as standard, which terminal adapter includes:

first connectors for inserting said adapter between two sections of a connection between said terminal and said network, and a passive identifier circuit specific to one type of terminal that said network is able to detect, said passive identifier circuit being connected to at least two conductors of a network side section of said connections, wherein said terminal adapter is external to said terminal and said network, and said passive identifier circuit is encompassed within said terminal adapter.

2. The adapter claimed in claim 1 wherein said passive identifier circuit is connected to at least two conductors of said network side section of said connection that convey said remote power feed.

3. The terminal adapter claimed in claim 1 further including conductors connecting some conductors of said network side section of said connection to some conductors of said terminal side section of said connection to apply a remote power feed voltage to the appropriate conductors of said terminal side section of said connection.

4. The terminal adapter claimed in claim 1 further including a second connector connected to some conductors of said network side section of said connection and wherein said conductors are adapted to provide a remote power feed voltage and said second connector is adapted to be connected to a power supply input of a terminal but not adapted to be connected to a data input of a terminal.

5. The terminal adapter claimed in claim 1, wherein said passive identifier circuit is one of a resistor and capacitor which is specific to said one type of terminal.

* * * * *